(12) United States Patent
Vafin et al.

(10) Patent No.: US 9,036,699 B2
(45) Date of Patent: May 19, 2015

(54) VIDEO CODING

(75) Inventors: Renat Vafin, Tallinn (EE); Mattias Nilsson, Sundbyberg (SE); Soren Vang Andersen, Esch-sur-Alzette (LU)

(73) Assignee: Skype, Dublin (IE)

( * ) Notice: Subject to any disclaimer, the term of this patent is extended or adjusted under 35 U.S.C. 154(b) by 207 days.

(21) Appl. No.: 13/274,904

(22) Filed: Oct. 17, 2011

(65) Prior Publication Data

US 2012/0328002 A1  Dec. 27, 2012

(30) Foreign Application Priority Data

Jun. 24, 2011 (GB) .................................. 1110760.4

(51) Int. Cl.
| | |
|---|---|
| *H04N 7/26* | (2006.01) |
| *H04N 19/194* | (2014.01) |
| *H04N 19/176* | (2014.01) |
| *H04N 19/147* | (2014.01) |
| *H04N 19/103* | (2014.01) |
| *H04N 19/156* | (2014.01) |
| *H04N 19/19* | (2014.01) |

(52) U.S. Cl.
CPC ........... *H04N 19/194* (2013.01); *H04N 19/176* (2013.01); *H04N 19/147* (2013.01); *H04N 19/103* (2013.01); *H04N 19/156* (2013.01); *H04N 19/19* (2013.01)

(58) Field of Classification Search
CPC ............................ H04L 1/0618; H04B 1/1081
USPC .................................. 382/155–161; 375/240
See application file for complete search history.

(56) References Cited

U.S. PATENT DOCUMENTS

| | | |
|---|---|---|
| 6,097,897 A | 8/2000 | Ide |
| 6,683,988 B1 | 1/2004 | Fukunaga et al. |
| 7,142,599 B2 * | 11/2006 | Henocq .................... 375/240.03 |

(Continued)

FOREIGN PATENT DOCUMENTS

| | | |
|---|---|---|
| CN | 1759610 | 4/2006 |
| CN | 101162930 | 4/2008 |

(Continued)

OTHER PUBLICATIONS

"International Search Report and Written Opinion", Application No. PCT/US2012/053581, (Dec. 11, 2012),14 pages.

(Continued)

*Primary Examiner* — Sath V Perungavoor
*Assistant Examiner* — Kate Luo
(74) *Attorney, Agent, or Firm* — Sonia Cooper; Jim Ross; Micky Minhas

(57) ABSTRACT

A method of encoding a video stream comprising: for each of a plurality of first image portions to be encoded in an outgoing video stream, selecting a preferred one of a set of potential encoding modes using a first process comprising an estimation of distortion of the first image portion and a measure of bit rate required to encode the first image portion for each of the first image portion's potential encoding modes; encoding each of the first image portions of the outgoing stream using the respective selected encoding mode; for each of a plurality of second image portions of a video stream, applying a second process comprising at least an estimation of distortion of the second image portion; and using an output of the second process resulting from the second image portions to bias the first process in said selection of the encoding modes for the first portions.

42 Claims, 5 Drawing Sheets

(56) References Cited

U.S. PATENT DOCUMENTS

| | | | |
|---|---|---|---|
| 7,317,759 | B1 | 1/2008 | Turaga et al. |
| 8,180,915 | B2 * | 5/2012 | Zhao .............................. 709/231 |
| 8,457,202 | B2 * | 6/2013 | Wang et al. .............. 375/240.13 |
| 8,804,836 | B2 | 8/2014 | Nilsson et al. |
| 8,908,761 | B2 | 12/2014 | Nilsson et al. |
| 2002/0064228 | A1 | 5/2002 | Sethuraman et al. |
| 2003/0012202 | A1 | 1/2003 | Fukutomi |
| 2004/0114817 | A1 | 6/2004 | Jayant et al. |
| 2004/0228537 | A1 | 11/2004 | Yeung et al. |
| 2005/0053299 | A1 | 3/2005 | Fuchs et al. |
| 2005/0135484 | A1 | 6/2005 | Lee et al. |
| 2005/0213657 | A1 | 9/2005 | Kodama et al. |
| 2005/0237987 | A1 | 10/2005 | Wang et al. |
| 2006/0056338 | A1 | 3/2006 | Abe et al. |
| 2006/0239348 | A1 | 10/2006 | Zhang |
| 2006/0291558 | A1 | 12/2006 | Schreier |
| 2007/0030894 | A1 | 2/2007 | Tian et al. |
| 2007/0160137 | A1 | 7/2007 | Guo et al. |
| 2008/0089414 | A1 | 4/2008 | Want et al. |
| 2008/0112481 | A1 | 5/2008 | Hsaing et al. |
| 2008/0247469 | A1 | 10/2008 | Vadapalli et al. |
| 2008/0310502 | A1 | 12/2008 | Kim et al. |
| 2008/0316364 | A1 | 12/2008 | Au et al. |
| 2009/0067495 | A1 * | 3/2009 | Au et al. .................. 375/240.12 |
| 2009/0080518 | A1 | 3/2009 | Au et al. |
| 2009/0086816 | A1 | 4/2009 | Leontaris et al. |
| 2009/0086827 | A1 | 4/2009 | Wu et al. |
| 2009/0110062 | A1 | 4/2009 | Au et al. |
| 2009/0135901 | A1 | 5/2009 | Au et al. |
| 2009/0190661 | A1 | 7/2009 | Nagori |
| 2009/0219991 | A1 | 9/2009 | Po et al. |
| 2009/0252227 | A1 | 10/2009 | NepomucenoLeung et al. |
| 2010/0161329 | A1 | 6/2010 | Chung et al. |
| 2010/0226262 | A1 | 9/2010 | Liu et al. |
| 2010/0238997 | A1 | 9/2010 | Yang et al. |
| 2010/0239015 | A1 | 9/2010 | Wang et al. |
| 2010/0278275 | A1 | 11/2010 | Yang et al. |
| 2010/0303148 | A1 | 12/2010 | Hiron |
| 2010/0316126 | A1 | 12/2010 | Chen et al. |
| 2011/0080952 | A1 | 4/2011 | Vadapalli et al. |
| 2011/0090960 | A1 | 4/2011 | Leontaris et al. |
| 2011/0103480 | A1 | 5/2011 | Dane |
| 2011/0119565 | A1 | 5/2011 | Chang et al. |
| 2011/0150113 | A1 | 6/2011 | Oyman et al. |
| 2011/0164677 | A1 * | 7/2011 | Lu et al. ................... 375/240.02 |
| 2011/0182356 | A1 | 7/2011 | Ammu |
| 2011/0206119 | A1 * | 8/2011 | Bivolarsky et al. ...... 375/240.12 |
| 2011/0286516 | A1 | 11/2011 | Lim et al. |
| 2012/0069927 | A1 | 3/2012 | Oyman et al. |
| 2012/0093017 | A1 | 4/2012 | Liu et al. |
| 2012/0121013 | A1 | 5/2012 | Lainema et al. |
| 2012/0327997 | A1 | 12/2012 | Nilsson |
| 2012/0327998 | A1 | 12/2012 | Nilsson |
| 2013/0044804 | A1 | 2/2013 | Nilsson |
| 2013/0058394 | A1 | 3/2013 | Nilsson |
| 2013/0058395 | A1 | 3/2013 | Nilsson |
| 2013/0058405 | A1 | 3/2013 | Zhao |
| 2013/0223513 | A1 | 8/2013 | Chen et al. |
| 2015/0071353 | A1 | 3/2015 | Nilsson et al. |

FOREIGN PATENT DOCUMENTS

| | | |
|---|---|---|
| CN | 101346999 | 1/2009 |
| CN | 101960466 | 1/2011 |
| EP | 1439712 | 7/2004 |
| EP | 2096874 | 9/2009 |
| EP | 2139138 | 12/2009 |
| EP | 2184925 | 5/2010 |
| EP | 2230849 | 9/2010 |
| GB | 2167267 | 5/1986 |
| GB | 2492329 | 1/2013 |
| JP | 10145794 | 5/1998 |
| WO | WO-2004004359 | 1/2004 |
| WO | WO-2006042323 | 4/2006 |
| WO | WO-2007015126 | 2/2007 |
| WO | WO-2007084475 | 7/2007 |
| WO | WO-2012171113 | 12/2012 |

OTHER PUBLICATIONS

"International Search Report and Written Opinion", Application No. PCT/US2012/053850, (Dec. 5, 2012),12 pages.

"International Search Report and Written Opinion", Application No. PCT/US2012/053583, (Dec. 5, 2012),13 pages.

"International Search Report and Written Opinion", Application No. PCT/US2012/051507, (Dec. 17, 2012),13 pages.

Alwihaibi, Abdullah et al., "Computation of the Residual Packet Loss Probability in a Binary Multicast Tree", (2003), 4 pages.

Chen, Chih-Ming "Error Resilience Transcoding Using Prioritized Intra-Refresh for Video Multicast Over Wireless Networks", (2005), 4 pages.

Naghdinezhad, Amir et al., "Distortion Estimation for Reference Frame Modification Methods", *19th European Signal Processing Conference (EUSIPCO* 2011), (2011), 5 pages.

Stockhammer, Thomas et al., "Rate-Distortion Optimization for JVT/H.26L Video Coding in Packet Loss Environment", *International Workshop on Packet Video*, 2002, (Apr. 24, 2002),12 pages.

Vadapalli, Sarat C., "Low-Complexity Frame-Level Joint Source-Channel Distortion Optimal, Adaptive Intra Refresh", *2008 IEEE 10th Workshop on Multimedia Signal Processing*, (2008), pp. 474-480.

Vadapalli, Sarat C., et al., "Efficient Alternative to Intra Refresh Using Reliable Reference Frames", *International Conference on Multimedia and Expo, 2007 IEEE*, (2007), 4 pages.

Zhang, Yuan et al., "Joint Source-Channel Rate-Distortion Optimization for H.264 Video Coding Over Error-Prone Networks", (2007), pp. 445-454.

Zhang, Yuan et al., "Optimum End-to-End Distortion Estimation for Error Resilient Video Coding", (2004), 4 pages.

"Search Report", GB Application No. 1115201.4, (Feb. 12, 2013), 3 pages.

"Search Report", GB Application No. 1115209.7, (Feb. 12, 2013), 3 pages.

"Search Report", GB Application No. 1110759.6, (Oct. 18, 2012), 3 pages.

"Search Report", GB Application No. 1110760.4, (Oct. 24, 2012), 4 pages.

"Search Report", GB Application No. 1110763.8, (Oct. 18, 2012), 3 pages.

"Search Report", GB Application No. 1114323.7, (Dec. 10, 2012), 3 pages.

"International Search Report and Written Opinion", Application No. PCT/EP2012/062163, (Aug. 7, 2012), 15 pages.

"International Search Report and Written Opinion", Application No. PCT/EP2012/062164, (Jul. 30, 2012), 14 pages.

"International Search Report and Written Opinion", Application No. PCT/EP2012/062162, (Aug. 7, 2012), 17 pages.

Chao, Yi-Chin et al., "An Approximate Square Criterion for H.264/AVC Intra Mode Decision", *Multimedia and Expo. 2888 IEEE International Conference on. IEEE*. Piscataway. NJ. USA, (Jun. 23, 2008), pp. 333-336.

Chen, Quqing et al., "Attention-Based Adaptive Intra Refresh for Error-Prone Video Transmission", video transmission, *IEEE Communications Magazine, IEEE Service Center*, Piscataway, US, vo l . 44, No. 1, (Jan. 1, 2007), pp. 52-60.

Lim, Keng-Pang et al., "JM text: Description of Joint Model Reference Encoding Methods and Decoding Concealment Methods", 24. JVT Meeting; 81. MPEG Meeting; 29.6.2887-5.7.2886; Geneva. CH;(Joint Video Team of ISO/IEC JTC1/SC29/WG11 and ITU-T SG . 16, (Jul. 3, 2007), 58 pages.

Liu, Meng et al., "Rate Control Based on Intermediate Description", *Visual Communications and Image Processing*; Jul. 11-14, 2010; Huang Shan, An Hu I , China, (Jul. 11, 2012), 10 pages.

Nyamweno, S et al., "Error Resilient Video Coding Via Weighted Distortion", *Multimedia ane Expo*, 2009. ICME 2009. IEEE International Conference on, IEEE, Piscataway, NJ, USA, (Jun. 28, 2009), pp. 734-737.

(56) References Cited

OTHER PUBLICATIONS

Rolin, Ruan "A Novel Intra Refreshment Algorithm for ROI", *Multimedia and Information Technology*, 2008. MMIT '08. International Conference on, IEEE, Piscataway, NJ, USA, (Dec. 30, 2008), pp. 62-65.
Sarwer, Mohammed G., et al., "Enhanced Low Complex Cost Function for H.264/AVC Intra Mode Decision", *Multimedia and Signal Processing (CMSP), 2811 International Conference on. IEEE*, (May 14, 2011), pp. 46-50.
Song, Mingzhou et al., "Motion Estimation in DCT Domain", *IEEE*, vol. 5, (1996), pp. 670-674.
Sullivan, Gary J., et al., "Rate-Distortion Optimization for Video Compression", *IEEE Signal Processing Magazine*, 15(6), (Nov. 1, 1998), pp. 74-90.
Wang, Yi et al., "Off-Line Motion Description for Fast Video Stream Generation in MPEG-4 AVC/H.264", *2006 IEEE International Conference on Multimedia and Expo (ICME 2006)*, Toronto, Ont., Canada, IEEE, Piscataway, NJ, USA, (Jul. 1, 2006), pp. 685-688.
Wiegand, Thomas et al., "Error Resilient Video Transmission Using Long-Term Memory Motion-Compensated Prediction", *IEEE Journal on Selected Areas in Communications*, IEEE Service Center, Piscataway, US, val. 18, No. 6, (Jun. 1, 2000), pp. 1050-1062.
Xiong, Bing et al., "A New Multiplication-Free Block Matching Criterion", *IEEE Transactions on Circuits and Systems for Video Technology*. IEEE Service Center. Piscataway. NJ. US. vo 1 . 18. No. 18, (Oct. 1, 2008), pp. 1441-1446.
Zhang, Yuan et al., "Error Resilience Video Coding in H.264 Encoder with Potential Distortion Tracking", *Image Processing*, 2004. ICIP '04. 2004 Conference on Singapore Oct. 24-27, 2004, Piscataway, NJ, USA,IEEE, val. 1, (Oct. 24, 2004), pp. 163-166.
"Non-Final Office Action", U.S. Appl. No. 13/274,739, Nov. 20, 2013, 14 pages.
"Non-Final Office Action", U.S. Appl. No. 13/274,922, Jan. 16, 2014, 18 pages.
"Non-Final Office Action", U.S. Appl. No. 13/275,046, Jan. 16, 2014, 21 pages.
"Non-Final Office Action", U.S. Appl. No. 13/274,865, Jan. 7, 2014, 24 pages.
"Non-Final Office Action", U.S. Appl. No. 13/274,881, Dec. 19, 2013, 29 pages.
"Notice of Allowance", U.S. Appl. No. 13/274,739, Jan. 9, 2014, 4 pages.
"Final Office Action", U.S. Appl. No. 13/274,865, Jul. 18, 2014, 24 pages.
"Final Office Action", U.S. Appl. No. 13/274,881, Sep. 16, 2014, 43 pages.
"Final Office Action", U.S. Appl. No. 13/274,922, Jul. 16, 2014, 23 pages.
"Non-Final Office Action", U.S. Appl. No. 13/274,881, Jul. 2, 2014, 37 pages.
"Notice of Allowance", U.S. Appl. No. 13/274,803, Jul. 30, 2014, 15 pages.
Girod, et al., "Feedback-Based Error Control for Mobile Video transmission", Proceedings of the IEEE, 87 (10), Oct. 1999, 17 Pages.
"Foreign Office Action", CN Application No. 201210320553.6, Sep. 15, 2014, 16 pages.
"Foreign Office Action", CN Application No. 201210320556.X, Nov. 3, 2014, 13 pages.
"Non-Final Office Action", U.S. Appl. No. 13/275,046, Dec. 9, 2014, 28 pages.
Wiegand, et al., "Rate-Distortion Optimized Mode Selection for Very Low Bit Rate Video Coding and the Emerging H.263 Standard", IEEE Transactions on Circuits and Systems for Video Technology, vol. 6, No. 2., Apr. 1996, pp. 182-190.
"Final Office Action", U.S. Appl. No. 13/275,046, May 22, 2014, 22 pages.
"Final Office Action", U.S. Appl. No. 13/274,881, Mar. 18, 2014, 32 pages.
"Foreign Office Action", CN Application No. 20120320325.9, Oct. 10, 2014, 18 pages.
"Non-Final Office Action", U.S. Appl. No. 13/274,881, Mar. 6, 2015, 42 pages.
Harmanci, et al.,"A stochastic framework for rate-distortion optimized video coding over error-prone networks", IEEE Transactions on Image Processing, vol. 16 Issue 3, Mar. 2007, 14 pages.
Stoufs, et al.,' "Scalable Joint Source-Channel Coding for the Scalable Extension of H.264/AVC", Circuits and Systems for Video Technology, Volume:18 Issue:12, Sep. 16, 2008, 14 pages.

* cited by examiner

VIDEO CODING

RELATED APPLICATION

This application claims priority under 35 U.S.C. §119 or 365 to Great Britain Application No. GB 1110760.4, filed Jun. 24, 2011. The entire teachings of the above application are incorporated herein by reference.

TECHNICAL FIELD

The present invention relates to balancing a trade-off between bitrate and distortion when encoding a video signal using intra and inter frame encoding.

BACKGROUND

A stream of video data to be encoded is illustrated schematically in FIG. 1a. The stream comprises multiple frames (F) each representing the video image at a different respective moment in time. As will be familiar to a person skilled in the art, for the purpose of encoding, each frame (F) is divided into portions and each portion may also be subdivided into smaller sub-portions, each portion or sub-portion comprising a plurality of pixels. For example, according to one terminology each frame of a video stream to be encoded is divided into macroblocks (MB) and each macroblock is sub-divided into blocks (b), each block comprising multiple pixels. Each frame may also be divided into independently decodable slices (S), each slice comprising one or more macroblocks. N.B. the divisions shown in FIG. 1a are only schematic for illustrative purposes and it will be appreciated that these are not necessarily meant to correspond to any actual encoding scheme—e.g. each frame is likely to contain a larger number of macroblocks.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system).

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction typically can be done from pixels in video frames different from the current frame (inter prediction) and from pixels in the same frame (intra prediction). That is, if encoded using intra frame encoding then a block or portion of the frame (the target block or portion) is encoded relative to another block or image portion in the frame (the reference block or portion); and if encoded using inter frame encoding then the target block or portion is encoded relative to a reference block or portion in another frame. This process is commonly referred to as prediction or prediction coding. The inter or intra prediction module will thus generate a prediction e.g. in the form of an indication of a neighbouring block in the case of intra frame encoding and/or a motion vector in the case of inter frame encoding. Typically the encoder also generates a residual signal representing a "left over" difference between the predicted block and the actual block. The intra prediction, motion vectors and residual are then output into the encoded video stream, typically via further coding stages such as a quantizer and entropy encoder. Hence most blocks in the video can be encoded in terms of a difference between blocks, which requires fewer bits to encode than encoding absolute pixel values and hence saves on bitrate. Intra prediction encoding typically requires more bits than inter prediction, though still represents a saving over encoding absolute values. Details of suitable inter and intra encoding techniques for video will be familiar to a person skilled in the art.

Modern codecs allow the use of different prediction encoding modes for different portions within a frame. The possibility of having different coding options increases the rate-distortion efficiency of a video codec. The optimal coding representation has to be found for every frame region. Typically, such region is a macroblock, e.g. of 16×16 pixels. I.e. so it is possible for an intra prediction or inter prediction mode to be selected individually for each macroblock, so that different macroblocks within the same frame can be encoded with different modes. It is also possible in some codecs to use different modes based on different levels of partitioning of macroblocks, e.g. selecting between a higher complexity mode in which a separate prediction is performed for each 4×4 block within a macroblock or a lower complexity mode in which prediction is performed based on only 8×8 or 8×16 blocks or even whole macroblocks. The available modes may also include different options for performing prediction. For example as illustrated schematically in FIG. 1b, in one intra mode the pixels of a 4×4 block (b) may be determined by extrapolating down from the neighbouring pixels from the block immediately above, or by extrapolating sideways from the block immediately to the left. Another special prediction mode called "skip mode" may also be provided in some codecs, which may be considered as an alternative type of inter mode. In skip mode (PSkip) the target's motion vector is inferred based on the motion vectors to the top and to the left and there is no encoding of residual coefficients. The manner in which the motion vector is inferred is consistent with motion vector prediction, and thus the motion vector difference is zero so it is only required to signal that the MB is a skip block.

According to the above, a coding representation may thus include block partition information, prediction mode, motion vector, quantization accuracy, etc. The optimal coding option depends on video content, bit rate, earlier coding decisions, etc. The accuracy of quantization of transform coefficients is typically chosen to meet a bit rate constraint. Furthermore, distortion should be minimized.

For example, the H.264 video coder provides a great flexibility in choosing the prediction mode. For inter prediction of the luma component, a macroblock of 16×16 pixels can be represented as one block of 16×16 pixels, or two blocks of 16×8 pixels, or two blocks of 8×16 pixels, or four blocks of 8×8 pixels. Further, an 8×8 block can be represented as one block of 8×8 pixels, or two blocks of 8×4 pixels, or two blocks 4×8 pixels, or four blocks of 4×4 pixels. The inter prediction is tried for each allowed partition of a macroblock. The inter prediction of a block is represented by indexing the reference frame(s) and the motion vector(s) (spatial shift from the reference block in the respective reference frame), which typically are estimated with sub-pixel precision. For intra prediction of the luma component, there are four possible modes for 16×16 blocks and nine possible modes for 4×4 blocks. Further, there are four possible modes for chroma components. The best prediction mode is chosen by comparing the performance of inter and intra prediction modes.

The rate-distortion performance of a video codec such as H.264 AVC depends to a large extent on the performance of the macroblock mode selection o. That is, the procedure of determining whether the macroblock is best encoded, in terms of rate-distortion trade-offs, using e.g. intra mode or inter mode (predicted from previously encoded frame). From a robustness perspective, intra coded macroblocks are beneficial since they stop temporal error propagation (assuming the use of constrained intra prediction, i.e. intra prediction from inter predicted macroblocks is prohibited). However, intra coded macroblocks are generally more expensive in terms of rate compared to inter coded macroblocks, and thus it is important to introduce intra coded macroblocks systematically such that the distortion (e.g. average distortion) at the decoder is minimized given a certain bit budget.

The rate-distortion performance optimization problem can be formulated in terms of minimizing distortion under a bit rate constraint R. A Lagrangian optimization framework is often used to solve the problem. There, the optimization criterion is formulated as $$J = D(m,o) + \lambda R(m,o), \quad (1)$$

where J represents the Lagrange function, D represents a measure of distortion (a function of mode o and macroblock m or macroblock sub-partition), R is the bitrate, and λ is a parameter defining a trade-off between distortion and rate.

In this application solving the Largrangian optimization problem means finding the encoding mode o which minimizes the Lagrange function J, where the Lagrange function J comprises at least a term representing distortion, a term representing bitrate, and a factor (the "Lagrange multiplier") representing a tradeoff between the two. As the encoding mode o is varied towards more thorough or better quality encoding modes then the distortion term D will decrease. However, at the same time the rate teen R will increase, and at a certain point dependent on the increase in R will outweigh the decrease in D. Hence the expression J will have some minimum value, and the encoding mode o at which this occurs is considered the optimal encoding mode.

In this sense the bitrate R, or rather the term λR, places a constraint on the optimization in that this term pulls the optimal encoding mode back from ever increasing quality. The mode at which this optimal balance is found will depend on λ, and hence λ may be considered to represent a tradeoff between bitrate and distortion.

The Lagrangian optimization is commonly used in the process of choosing coding decisions, and is applied for every frame region (e.g. every macroblock of 16×16 pixels).

The distortion D may be quantified as sum of squared differences (SSD) between original and reconstructed pixels; and may be evaluated to account for all processing stages including: prediction, transform (from a spatial domain representation of the pixels of each block or macroblock to a transform domain representation such as an optical frequency domain representation), and quantization (the process of converting a digital approximation of a continuous signal to more discrete, lower granularity quantization levels). Furthermore, in order to compute reconstructed pixels, steps of inverse quantization, inverse transform, and inverse prediction must be performed. Commonly, the rate term R also accounts for coding of all needed parameters, including parameters describing prediction and quantized transform coefficients.

Parameters are typically coded with an entropy coder, and in that case the rate can be an estimate of the rate that would be obtained by the entropy coder, or can be obtained by actually running the entropy coder and measuring the resulting rate for each of the candidate modes. Entropy coding/decoding is a lossless process and as such doesn't affect the distortion.

This kind of process may be referred to herein as a full complexity rate-distortion optimization (or full RDO).

In one particular example disclosed by Zhang et al., "Error resilience video coding in H.264 encoder with potential distortion tracking", In Proc. IEEE International Conference on Image Processing, pp. 163-166, 2004, incorporated herein by reference in its entirety. The distortion term may take into account not just the source coding distortion intrinsic to the codec but also end-to-end distortion, i.e. a probabilistic estimate of distortion that will be experienced due to packet loss over a channel. However this is not a requirement for "full" complexity RDO.

It will be seen from everything discussed above that the number of coding options can be quite high, and therefore the computational load needed to evaluate them can become a limiting factor. Given a high number of possible coding options, evaluating the Lagrangian optimization criterion that accounts for all processing stages (and also requires all inverse processing stages to be performed) can become a computationally very demanding task. Therefore, an alternative lower-complexity optimization criterion is also in common use:

$$J' = D'(m,o) + \lambda' R'(m,o) \quad (2)$$

where D' is the prediction distortion, and R' is the rate for parameters describing prediction (e.g., prediction modes, motion vectors). R' does not take the rate of residual coefficients into account.

The prediction distortion D' takes into account only the distortion after the intra or inter prediction (or more precisely the residual after prediction), and not the effect of other encoder stages such as transform from the spatial domain and quantization (nor their inverses). Further, this simplified distortion measure is quantified as the sum of absolute differences (SAD) between the original and predicted samples, which requires fewer computations compared to SSD. That is:

$$D' = \sum_i |s_i - s'_{pred_i}| \quad (3)$$

where $s_i$ are the original input samples and $s_{pred}{'}_i$ are the predicted samples without taking into account the effect of being reconstructed through a forward and inverse transform and quantization. So as well as being based on SAD instead of SSD, the lower complexity distortion term D' represents the difference between the original and predicted samples, rather than the difference between original and reconstructed pixels as represented in the full complexity version of the calculation above.

Further, the rate term R' only represents the bitrate cost of side information (motion vector or indication of intra prediction, prediction mode, and indication of macroblock partitioning); and does not take into account the bitrate cost of the transformed and quantized residual.

Thus, the simplified computation only needs the prediction step to be performed. The steps of transform and quantization, as well as inverse quantization, inverse transform, and inverse prediction are omitted. Hence the complexity of evaluating performance of a coding option is therefore reduced. This kind of process may be referred to herein as low-complexity rate-distortion optimization (or low-complexity RDO).

On the other hand, since low-complexity RDO approximates the prediction step only, the resulting final rate-distortion performance is typically reduced. Without being limiting, in the inventors' experiments they have observed that the low-complexity RDO may result in performance drop of 0.5-1.5 dB compared to the full RDO at the same bit rate. Subjectively, the reconstructed videos also have lower quality.

SUMMARY

The present invention seeks to achieve a higher performance rate-distortion optimization than would result from a low complexity rate-distortion optimization (RDO) alone, but without incurring the full processing cost incurred by direct application of a higher complexity RDO to every portion of the video stream to be encoded.

The present invention is based on an idea that optimization-related values that would be obtained for some image portions using one process can be extrapolated to some extent to other image portions, by using such values to guide or influence the RDO process used for those other portions. For example a higher complexity RDO can be computed for only some of the actual image portions during the live encoding process and then extrapolated to other portions of the live stream, or a higher complexity distortion estimation can be performed "offline" for a sample video stream during a training phase prior to coding and then extrapolated to the actual live stream. A combination of these two possibilities may also be used.

Thus the invention avoids the need to perform the higher or full complexity RDO for at least some and potentially all image portions in the live video stream to be encoded, but can still achieve an approximation of the performance benefit of higher complexity RDO.

According to one aspect of the present invention, there is provided a method of encoding a video stream comprising a plurality of frames, each frame comprising a plurality of image portions, the method comprising: for each of a plurality of first image portions to be encoded in an outgoing video stream, selecting a preferred one of a set of potential encoding modes using a first process comprising an estimation of distortion of the first image portion and a measure of bit rate required to encode the first image portion for each of the first image portion's potential encoding modes; encoding each of the first image portions of the outgoing stream using the respective selected encoding mode; for each of a plurality of second image portions of a video stream, applying a second process comprising at least an estimation of distortion of the second image portion; and using an output of the second process resulting from the second image portions to bias the first process in said selection of the encoding modes for the first portions.

In embodiments, the first process may be a lower-complexity process and the second process may be a higher-complexity process.

In embodiments, the second image portions may also be image portions of said outgoing video stream and the method may comprise: for each of the plurality of second image portions to be encoded in the outgoing video stream, selecting a preferred one of a set of potential encoding modes using the second process which comprises an estimate of distortion of the second image portion and a measure of bit rate required to encode the second image portion for each of the second image portion's potential encoding modes; and encoding each of the second image portions of the outgoing stream using the respective selected encoding mode.

The second image portions may be adjacent neighbours of the first image portions.

Said biasing may comprise limiting the set of potential encoding modes for each of the first image portions to those selected for a plurality of the second image portions A ratio of first to second portions in the outgoing video stream may be selected in dependence on available processing resources.

In further embodiments, the second image portions may be image portions of a training video stream, and the second process may be applied in a training phase prior to encoding the outgoing video stream.

Said biasing may comprise: applying both the second process and the first process to the second image portions in the training phase; based on the training phase, determining a bias term representing a difference in one or both of the distortion estimation and the rate measure of the first and second processes; and introducing the bias term into the first process when used to select the encoding modes of the first image portions.

The set of encoding modes may comprise at least an intra frame mode and an inter frame.

The set of encoding modes may comprise a plurality of intra frame modes.

The set of encoding modes may comprise a skip mode.

The lower-complexity process may take into account an effect of prediction coding in its estimation of distortion but not an effect of quantization; whereas the higher-complexity process may take into account the effect of prediction coding and quantization in its estimation of distortion.

The lower-complexity process may take into account an effect of prediction coding in its estimation of distortion but not an effect of transformation from a spatial domain representation to a transform domain representation prior to quantization, whereas the higher-complexity process may take into account the effect of prediction coding, transformation and quantization in its estimation of distortion.

The lower-complexity process may not take into account a cost of encoding a residual signal in its measure of bit rate, whereas the higher-complexity process may comprise a measure of bit rate taking into account the cost of encoding a residual signal.

The lower-complexity process may not not take into account an effect of entropy encoding in its measure of bit rate, whereas the higher-complexity process may comprise a measure of bit rate taking into account the effect of entropy encoding.

The higher-complexity process may take into account a probable effect of loss over a channel, whereas the lower-complexity process may not.

The higher-complexity process may integrate the effect of past loss forward over time.

According to another aspect of the present invention, there is provided a computer program product for encoding a video stream comprising a plurality of frames, each frame comprising a plurality of image portions, the computer program product being embodied on a non-transitory computer-readable medium and comprising code configured so as when executed on a process to perform the operations of: for each of a plurality of first image portions to be encoded in an outgoing video stream, selecting a preferred one of a set of potential encoding modes using a first process comprising an estimation of distortion of the first image portion and a measure of bit rate required to encode the first image portion for each of the first image portion's potential encoding modes; encoding each of the first image portions of the outgoing stream using the respective selected encoding mode; for each of a plurality of second image portions of a video stream, applying a second process comprising at least an estimation of distortion of the second image portion; and using an output of the second process resulting from the second image portions to bias the first process in said selection of the encoding modes for the first portions.

In embodiments, the computer program product may be further configured so as when executed to perform operations in accordance with any of the above method features.

According to another aspect of the present invention, there may be provided an apparatus comprising an encoder for encoding a video stream comprising a plurality of frames, each frame comprising a plurality of image portions, the encoder being configured to: for each of a plurality of first image portions to be encoded in an outgoing video stream, select a preferred one of a set of potential encoding modes using a first process comprising an estimation of distortion of the first image portion and a measure of bit rate required to encode the first image portion for each of the first image portion's potential encoding modes; encode each of the first image portions of the outgoing stream using the respective selected encoding mode; for each of a plurality of second image portions of a video stream, apply a second process comprising at least an estimation of distortion of the second image portion; and use an output of the second process resulting from the second image portions to bias the first process in said selection of the encoding modes for the first portions.

In embodiments the encoder may be further configured to perform operations in accordance with any of the above method features.

BRIEF DESCRIPTION OF THE DRAWINGS

For a better understanding of the present invention and to show how it may be put into effect, reference is made by way of example to the accompanying drawings in which.

DETAILED DESCRIPTION

Figure 2:
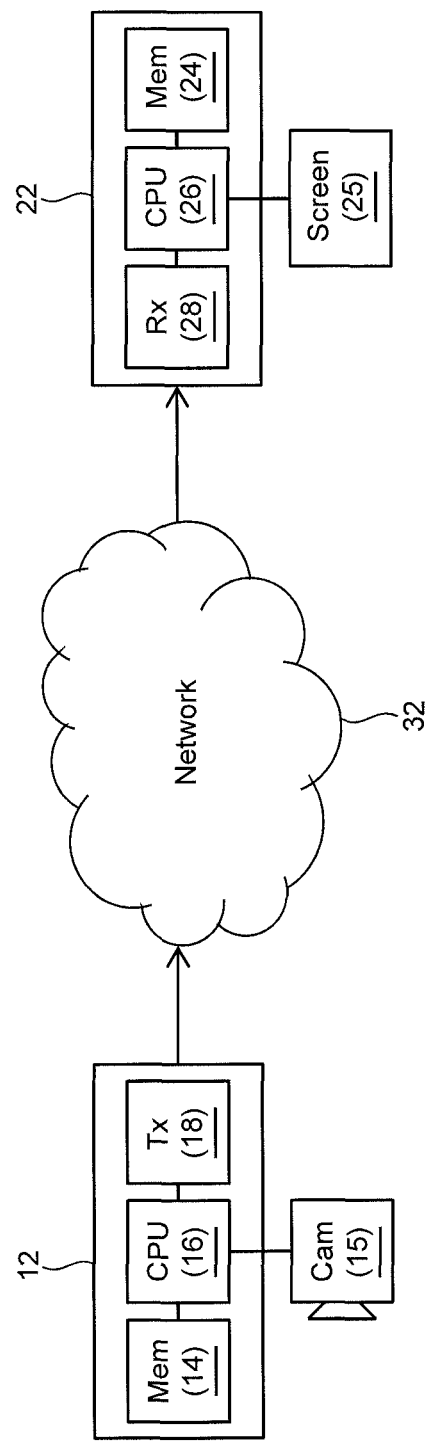
FIG. 2 is a schematic block diagram of a communication system.

An example communication system in which video coding may be employed is illustrated schematically in the block diagram of FIG. 2. The communication system comprises a first, transmitting terminal 12 and a second, receiving terminal 22. For example, each terminal 12, 22 may comprise a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a storage medium 14 such as a flash memory or other electronic memory, a magnetic storage device, and/or an optical storage device. The first terminal 12 also comprises a processing apparatus 16 in the form of a CPU having one or more cores; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a storage medium 24 such as an electronic, magnetic, and/or an optical storage device; and a processing apparatus 26 in the form of a CPU having one or more cores. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage medium 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage medium on the second terminal 22 stores at least a video decoder arranged to be executed on its own processing apparatus 26. When executed the decoder receives the encoded video stream from the receiver 28 and decodes it for output to the screen 25.

Figure 3:
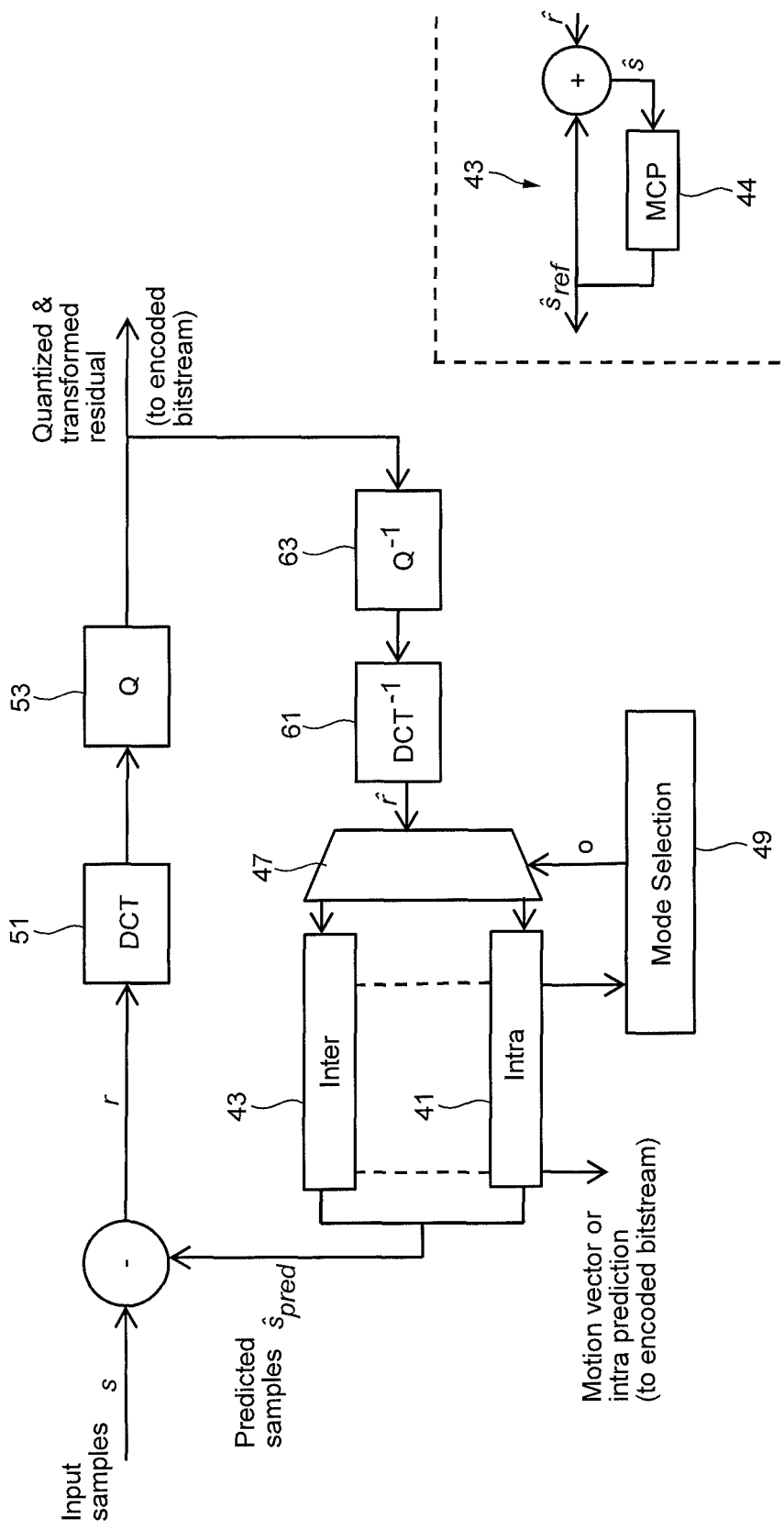
FIG. 3 is a schematic block diagram of an encoder.

FIG. 3 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, and a subtraction stage (−). The encoder also comprises a switch 47 and mode selection module 49. Each of the modules or blocks is preferably implemented as a portion of code stored on the transmitting terminal's storage medium 14 and arranged for execution on its processing apparatus 16, though the possibility of some or all of these being wholly or partially implemented in dedicated hardware circuitry is not excluded.

Each of the switch 47 and mode selection module 49 is arranged to receive an instance of input video stream comprising a plurality of macroblocks MB. The mode selection module 49 is arranged to select a coding mode "o" for each macroblock and is operatively coupled to the multiplexer 47 so as to control it to pass the output of the inverse quantizer 63 to the input of either the intra prediction module 41 or inter prediction module 43 as appropriate to the selected mode. The mode selection module 49 may also be arranged to indicate the selected mode "o" to the relevant prediction module 41, 43 (e.g. to indicate a 4×4 partition mode, 8×8 mode, skip mode, etc). The output the intra prediction module 41 or inter prediction module 43 is then coupled on to an input of the subtraction stage (−) which is arranged to receive the unencoded input video stream at its other input and subtract the predicted blocks from their unencoded counterparts, thus generating the residual signal. The residual blocks are then passed through the transform (DCT) module 51 where their residual values are converted into the frequency domain, then to the quantizer 53 where the transformed values are converted to discrete quantization indices. The quantized, transformed signal is fed back though the inverse quantizer 63 and inverse transform module 61 to generate a predicted version of the blocks (as would be seen at the decoder) for use by the selected prediction module 41, 43. An indication of the predictions used in the prediction modules 41,43, the motion vectors generated by the inter prediction module 43 and the quantized, transformed indices of the residual as generated by the transform and quantization modules 51, 53 are all output for inclusion in the encoded video stream, typically via a further, lossless encoding stage such as an entropy encoder (not shown) where the prediction values and transformed, quantized indices may be further compressed using lossless encoding techniques known in the art.

As mentioned, the present invention uses a result of a higher-complexity process applied to certain image portions to bias a lower-complexity process in its selection of an encoding mode for another, target image portion such as a macroblock of a video stream to be encoded. Lower complexity in this context means incurring fewer processing cycles when executed on a process.

The lower-complexity process may comprise a low-complexity RDO as discussed above, e.g. as defined by equations (2) and (3). That is, where the distortion is measured as the SAD between the original and predicted samples (without forward and inverse transform and quantization), and the rate term only measures the rate cost of the side information (not the residual).

The higher complexity RDO may be based on the full-complexity RDO as discussed above. In this case the distortion term preferably measures the SSD between the original and reconstructed samples (i.e. the samples having been predicted, transformed, quantized, de-quantized, and inverse transformed). The rate term also measures the cost of both the side information and residual, after entropy encoding.

In one optional embodiment, the distortion term of the higher complexity process may take into account end-to-end distortion, that is an estimate of distortions at the decoder due to packet or frame losses, e.g. as defined by Zhang et al. Alternatively the higher complexity RDO may be an improved version of Zhang's process, to be discussed in more detail later. However, neither of these is a requirement.

First two embodiments will be described showing how a result of a higher-complexity optimization-related process can be used to bias a lower complexity RDO process.

The exemplified methods of the present invention are based on modelling assumptions that optimization criterion values for a pixel block that would be obtained using full RDO can be fairly extrapolated using those values computed for other blocks. The values for the other blocks are computed either during the encoding process, or during a training phase prior to coding, or as combinations thereof.

In a first embodiment of the present invention, the complexity of rate-distortion optimization is reduced by performing full RDO only for a number of selected blocks (macroblocks), and extrapolating coding decisions for the remaining blocks using the fully optimized decisions of those selected blocks.

Figure 4:
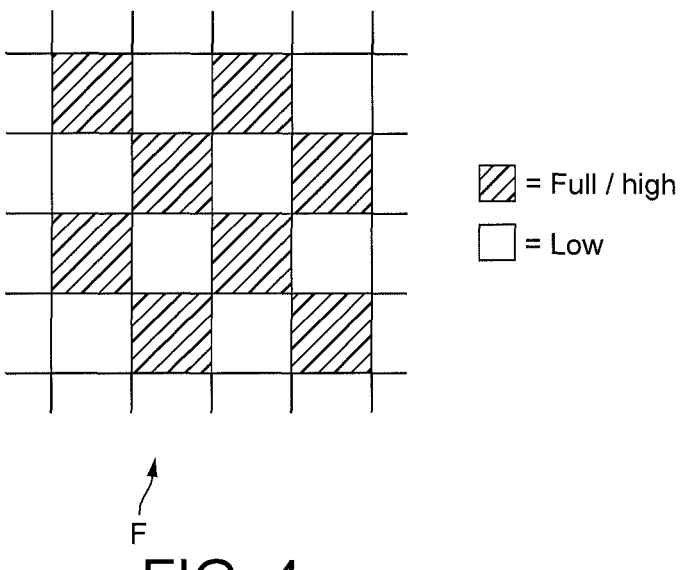
FIG. 4 is a schematic representation of an RDO scheme.

An example of the first embodiment is illustrated schematically in FIG. 4.

In one example of this, full RDO is performed for a number of selected blocks or macroblocks, e.g. those shown cross-hatched in the illustrated frame F in FIG. 4. This results in a coding decision o for each. Then, possible coding options for each remaining block or macroblock, e.g. those shown blank in FIG. 4, are chosen from the subset of possible coding options that contains optimal coding options of some of the selected blocks. That is, the RDO for the remaining blocks or macroblocks (those shown blank in FIG. 4) is constrained to choosing from amongst the coding modes already decided by the full complexity RDO for a plurality of the selected others (those shown cross-hatched in FIG. 4).

The selected blocks for which full RDO is performed can be chosen as being spatial neighbours to the remaining block, as belonging to the same object in the video scene as a remaining block, having similar properties to a remaining block (e.g. similar motion or similar texture), etc., or combinations thereof. The coding options from the subset of possible coding options can then be evaluated by using either full RDO or low-complexity RDO (in both cases only considering the subset of coding options).

Optimally, the number of selected and remaining blocks is chosen based on available CPU resources. Higher available CPU allows for more blocks to be coded using the full RDO, and vice versa.

A second embodiment of the present invention is based on training a model that describes correlations between optimization criteria values obtained using full RDO and low-complexity RDO. When optimizing coding decisions, the low-complexity optimization criterion is pre-evaluated for at least some blocks or macroblocks of an "offline" training video stream (e.g. all blocks, or remaining blocks, or one block), and is compared to the results of the higher-complexity version. This model is then used to estimate the optimization criterion value that would be obtained with full RDO. The optimal coding decision is found using the estimated values.

Figure 5:
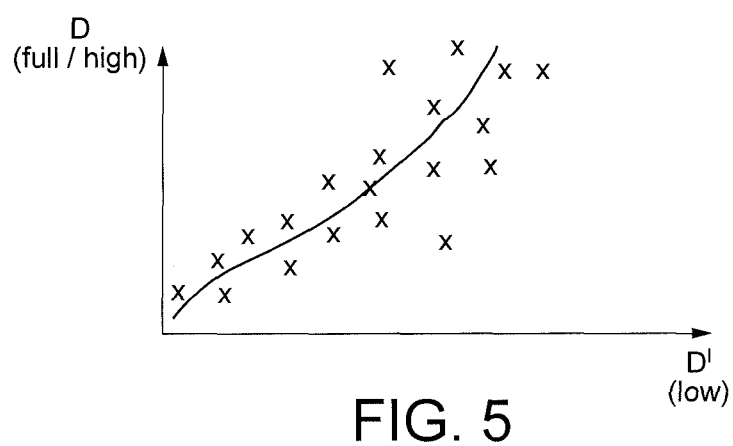
FIG. 5 is a schematic representation of another RDO scheme.

An example of the second embodiment is illustrated schematically in FIG. 5.

In one example, a model is trained that describes a bias between optimization criteria values obtained using full RDO and low-complexity RDO. When optimizing coding decisions, the low-complexity optimization criterion is evaluated "offline" for at least some blocks or macroblocks of the training video sequence (all blocks, or remaining blocks, or one block) in a training phase such as at the design stage of the codec. For instance, the distortion measure D determined by the higher-complexity process and the distortion measure D' determined by the lower-complexity process may be evaluated for a plurality of the same blocks or macroblocks in the training video. Still offline in the training phase, this model can then be used to estimate the bias term $D_{bias}$, e.g. by fitting a curve of the higher-complexity distortion measure D against the lower complexity measure D' as illustrated in FIG. 5 then using the fitted curve to look up a value $D_{bias}$ representing the amount of correction that should be applied to compensate for the lower complexity estimate. A different respective curve may be determined during this training phase for each of the different possible coding modes. This bias term is then added to the value measured using the low-complexity RDO to estimate the value that would be obtained with full RDO. Alternatively or additionally, a similar technique could be applied for the rate measure R.

The optimal coding decisions for the blocks or macroblocks in the actual live outgoing stream to be encoded are then found using the estimated values.

$$J'=D'(m,o)+D_{bias}(m,o)+\lambda'R'(m,o) \qquad (1c)$$

Modelling in the methods of the present invention can use sorting and/or clustering of pixel blocks according to any suitable measure(s). This training phase is preferably performed at the design stage and then built into the codec, e.g. using a look-up table.

Figure 1A:
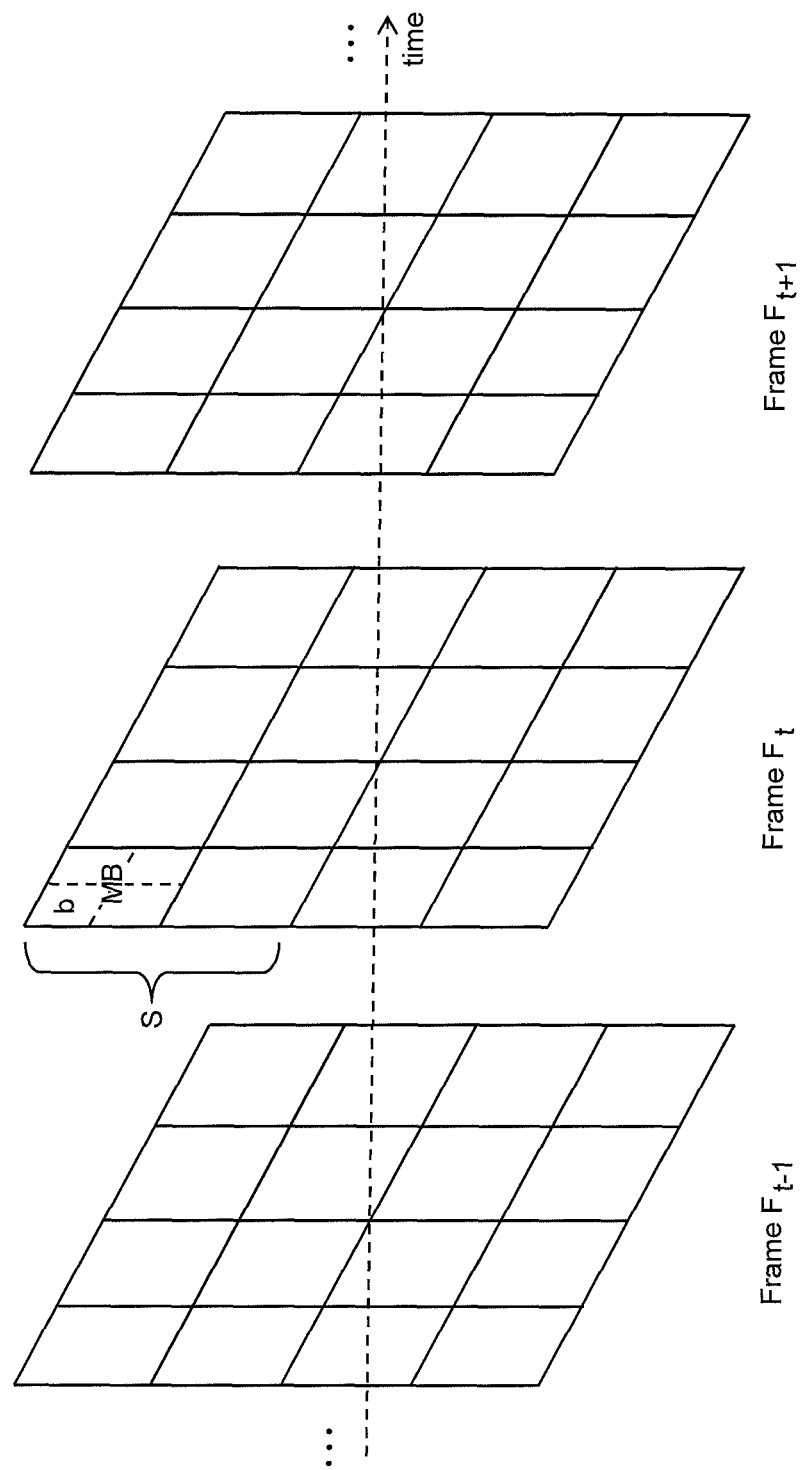
FIG. 1a is a schematic representation of a video stream.
Figure 1B:
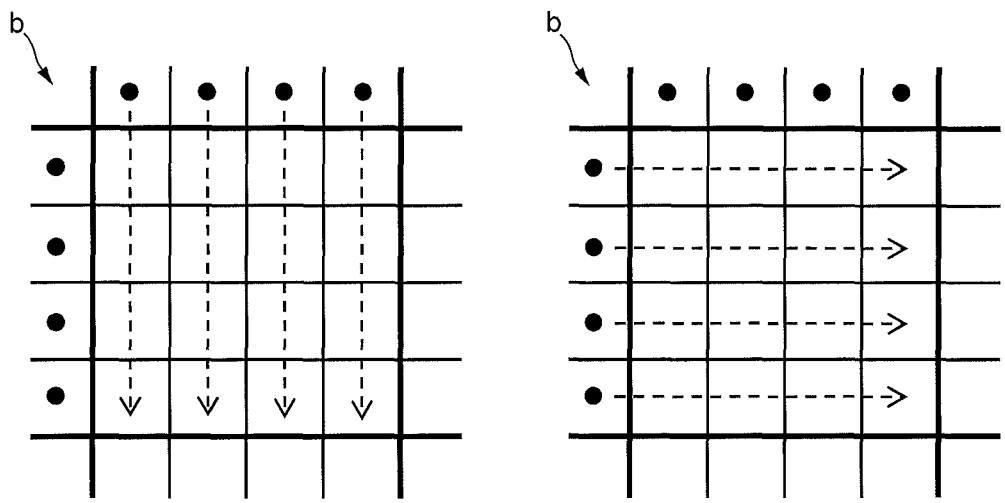
FIG. 1b is a schematic representation of some intra prediction coding modes.

The invention is preferably implemented in an encoder similar to that described in relation to FIG. 3, but with a modified mode selection module 49. It may be used to encode a video stream of the kind illustrated FIG. 1, and implemented in a communication system such as that of FIG. 2.

The following now describes an optional addition to the full RDO process which may optionally be used in conjunction with either the first of second embodiments of the invention in a preferred implementation. The improvement is based either on Zhang's process or on a modification of Zhang. However, it should be noted again that neither Zhang's approach nor the optional improvement described below is intended to limit the scope of the present invention in its broadest sense.

As mentioned, mode selection may involve optimizing (e.g. minimizing) a Lagrangian type function:

$$J = D(m,o) + \lambda R(m,o), \quad (1)$$

where J represents the Lagrange function, D represents a measure of distortion (a function of mode o and macroblock m or macroblock sub-partition), R is the bitrate, and λ is a parameter defining a trade-off between distortion and rate.

In a conventional case the distortion term D only takes into account the source coding distortion, i.e. due to imperfections in the encoder such as the distortion introduced by quantization. It does not take into account the distortion that may be introduced due to loss of data over the channel, e.g. due to packet loss in transmission over a packet-based network 32.

On the other hand, loss adaptive techniques such as those of the present invention and Zhang attempt to define a measure of "end-to-end" distortion taking into account both the source encoding and the distortion due to loss of data over the channel The end-to-end distortion for a given (target) block may be described as:

$$D = (1-p)D_{arrival} + pD_{loss} \quad (4)$$

Where $D_{arrival}$ is an estimate of the distortion that will be experienced if the target block does arrive at the decoder, and $D_{loss}$ is an estimate of the distortion that will be experienced if the target block does not arrive at the decoder due to packet loss over the channel, e.g. due to loss of a packet comprising that block over a packet-based network 32. The parameter p is an estimate of the probability of a loss event occurring over the channel that results in the block in question being lost, e.g. an estimate of the probability of a packet loss.

$D_{arrival}$ represents not only the source coding distortion but also the distortion that will be introduced due to distortion of a block's past, i.e. distortion in one or more reference blocks from which the target block is to be predicted. Therefore $D_{arrival}$ comprises both a source coding distortion term $D_s$ and an error propagation distortion term $D_{ef\text{-}ref}$ which represents a distortion in the predicted target block's history (i.e. distortion in the target blocks' reference block which will carry forward into the target block):

$$D_{arrival} = D_s + D_{ep\text{-}ref} \quad (5)$$

$D_{loss}$ comprises a loss due to concealment. If a target block is not received then the decoder will apply a concealment algorithm which could involve freezing a previously decoded block, or interpolating or extrapolating from one or more successfully decoded blocks (either from the current frame and/or a previous frame). Therefore $D_{loss}$ can be identified as the distortion due to this concealment process:

$$D_{loss} = D_{ec} \quad (6)$$

So examining equation (4), the term $D_s$ represents an estimate of the distortion that will be experienced if there is no loss at all, the term $D_{ec}$ represents an estimate of the distortion that will be experienced if the target block is lost, and the term $D_{ep\text{-}ref}$ represents an estimate of the distortion that will be experienced if the target block is successfully received but something in its history is lost (if the target block's reference block is lost, or the reference block's reference block is lost, etc.)

$D_s$ and $D_{ep\text{-}ref}$ are functions of encoding mode selection o. $D_{ec}$ is not a function of mode selection o and so is dropped from the Lagrange expression (it does not matter how a lost block was encoded—it is still lost). Hence the optimization can be written as:

$$o_{opt} = \underset{o}{\operatorname{argmin}}\bigl(D_s(m, o) + D_{ep\text{-}ref}(m, o) + \lambda R(m, o)\bigr), \quad (7)$$

$D_s$ is deterministic as it is based on information that can be known at the encoder, for example based on the difference between the raw input samples values s and the reconstructed sample values ŝ. The encoder runs a parallel instance of the decoder at the encoder side (or an approximation of it) —see the inset detailing the inter prediction module 43 in FIG. 3. The inter prediction module 43 comprises a motion compensation prediction (MCP) block 44 and addition stage (+) arranged to determine the reconstructed samples ŝ by combining the predicted samples $\hat{s}_{pred}$ and the reconstructed residual r̂, i.e. $\hat{s}_i = \hat{r} + \hat{s}_{pred}$ for each sample index i. In the case of inter encoding, at the encoder the predicted samples $\hat{s}_{pred}$ may be the same as the samples of the reference block $\hat{s}_{ref}$ (the reference block in the reference frame just being offset by the motion vector relative to the target frame—see FIG. 1c, to be discussed again shortly).

Hence the encoder can determine the difference between the actual samples s and the reconstructed samples ŝ as seen at the encoder and (this so far ignores the possibility of loss which will introduce further distortion experienced at the decoder). The difference in samples may be calculated for example as the sum square difference (SSD) error over all sample indices i of the target block in question:

$$D_s = \sum_i [(s_i - \hat{s}_i)^2]. \quad (8)$$

However, $D_{ep\text{-}ref}$ remains to be estimated, which will be based on making some estimation concerning the channel over which the encoded data is to be transmitted (e.g. over packet-based network 32).

To achieve this, the mode selection module 49 in the encoder may be configured to maintain an error propagation distortion map $D_{ep}$ describing the distortion of each macroblock or partition of a macroblock within the most recently encoded frame. The mode selection module 49 is also arranged to determine a probability p that the packet containing the reference block from which a target block is to be predicted will be lost over the channel (and therefore also to implicitly or explicitly determine a probability 1−p that the packet does arrive). In a preferred embodiment the probability p is predetermined at the design stage based on statistical modelling, in which case the mode selection module 49 determines p by retrieving a value from memory 14. However, another possibility would be that the mode selection module 49 determines p based on feedback from the receiver 22.

The error propagation map may be expressed as:

$$D_{ep} = (1-p)D_{ep\text{-}arrival} + pD_{loss} \quad (9)$$

The error propagation map $D_{ep}$, comprises a distortion estimate for macroblock m or more preferably for each sub partition (block) m(k) within the most recently encoded frame. Hence it may be more explicitly written as:

$$D_{ep}(m(k))=(1-p)D_{ep\text{-}arrival}(m(k))+p_{loss}(m(k)) \qquad (10)$$

where m(k) denotes the $k^{th}$ sub-partition (e.g. block) of macroblock m and p the probability of packet loss.

$D_{loss}$ is equal to $D_{ec}$ as discussed above. $D_{ep\text{-}arrival}$ represents the differences over the channel, i.e. the difference between the reconstructed samples at the encoder and the reconstructed at the decoder. For example this could be quantified in terms of the sum of squared differences (SSD):

$$D_{ep\text{-}arrived} = \sum_i (\hat{s}_i - \tilde{s}_i)^2 \qquad (11)$$

Where $\tilde{s}_i$ are the samples (of indices i) received at the decoder taking into account both the source coding distortion and the distortion due to the channel I.e. $s_i$ are the raw unencoded input samples, $\hat{s}_i$ are the reconstructed samples at the encoder taking into account the source coding distortion (e.g. due to quantization), and $\tilde{s}_i$ are the samples taking into account the total end-to-end distortion including the lossy effect of the channel; $s_i \rightarrow \hat{s}_i \rightarrow \tilde{s}_i$.

$D_{ep\text{-}arrival}$ can be expanded to:

$$D_{ep\text{-}arrived} = \sum_i ((\hat{s}_{ref} + \hat{r}_i) - (\tilde{s}_{ref} + \hat{r}_i))^2 \qquad (12)$$

where $\hat{r}_i$ are the samples of the reconstructed residual. Therefore:

$$D_{ep\text{-}arrived} = \sum_i (\hat{s}_{ref} - \tilde{s}_{ref})^2 = D_{ep\text{-}ref} \qquad (13)$$

So substituting into equations (9) and (1), the error propagation map can be rewritten as:

$$D_{ep}=(1-p)D_{ep\text{-}ref}+pD_{ec} \qquad (14)$$

or:

$$D_{ep}(m(k))=(1-p)D_{ep\text{-}ref}(m(k))+pD_{ec}(m(k)) \qquad (15)$$

Considering the mode optimization problem, it may also be written:

$$D_{ep}(m(k),n+1)=(1-p)D_{ep\text{-}ref}(m(k),n,o_{opt})+pD_{ec}(m(k),n,o_{opt}) \qquad (16)$$

where n is the frame number, i.e. $D_{ep}(n+1)$ is the error propagation map to be used for making the mode selection for frame number n+1 given the existing decision $o_{opt}$ and distortion $D_{ep}(n)$ map for frame n.

As in Zhang, the $D_{ec}$ term may be also expanded:

$$D_{ep}(m(k),n+1)=(1-p)D_{ep\text{-}ref}(m(k),n,o_{opt})+p(D_{ec\text{-}rec}(m(k),n,o_{opt})+D_{ec\text{-}ep}(m(k),n)), \qquad (16a)$$

Where $D_{ec\text{-}rec}$ denotes the SSD between the reconstructed and error concealed pixels in the encoder, and $D_{ec\text{-}ep}$ the expected SSD between the error concealed pixels in the encoder and decoder.

Examining equation (16a), as explained above, the term $D_{ep\text{-}ref}$ represents the distortion that will be experienced if the target block is successfully received but something in its history is lost (if the target block's reference block is lost, or the reference block's reference block is lost, etc.). Further, $D_{ec\text{-}rec}$ represents an estimate of the distortion due to the nature of the concealment algorithm itself (somewhat analogous to the intrinsic source coding distortion $D_s$ for prediction). $D_{ec\text{-}ep}$ then represents an estimate of the distortion that will be experienced if both the target block is lost (and so needs to be concealed at the decoder) and something in the concealed target block's history is lost (if the block from which concealment is done is lost, or the block from which that block is predicted or concealed is lost, etc.).

So the distortion map $D_{ep}$ comprises a contribution due to new loss, resulting from $D_{ec\text{-}rec}$ and in part from $D_{ec\text{-}ep}$; and a contribution due to past loss, resulting from $D_{ep\text{-}ref}$ and in part also from $D_{ec\text{-}ep}$.

For the first frame in a sequence the frame will be coded with intra coding, in which case $D_{ep\text{-}ref}=0$ and therefore $D_{ep}=pD_{ec}$.

The error concealment distortion $D_{ec}$ is calculated by the mode selection module 49. The term $D_{ec\text{-}rec}$ is based on knowledge of the concealment algorithm, and may depend on the particular error concealment algorithm used. $D_{ec\text{-}ep}$ is calculated based on the existing (most recent) distortion map in a manner analogous to $D_{ep\text{-}ref}$, e.g. by copying the distortion of a co-located block in the case of a basic concealment algorithm or calculating a weighted sum of the distortions from multiple previously encoded blocks b1-b4 if a more sophisticated concealment is used that attempts to extrapolate motion (by analogy see discussion in relation to FIG. 1c below). Other ways of calculating $D_{ec}$ could be used—this could be any estimation of a difference between the original and the reconstructed samples in the encoder and the error concealed samples as would be seen at the decoder (i.e. the samples copied, interpolated or extrapolated from a previous received frame or a received region of the same frame to conceal the lost frame or region).

The mode selection module 49 then maintains the error propagation map for each subsequent inter predicted frame by updating it following each mode selection decision, now including a calculation of $D_{ep\text{-}ref}$ from knowledge of the existing error map using the motion vectors for the frame in question.

Figure 1C:
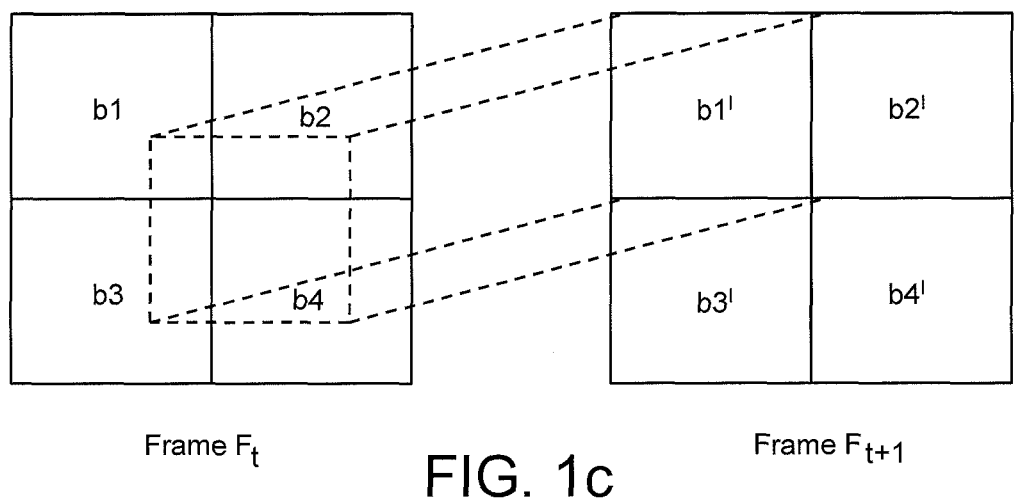
FIG. 1c is a schematic representation of an inter prediction coding mode.

An example of inter prediction (motion estimation) is illustrated in FIG. 1c. Four example blocks b1, b2, b3 and b4 are shown in a reference frame $F_t$ (number n), the reference frame having already been encoded. The blocks of the target frame $F_{t+1}$ (number n+1) are to be predicted from the reference frame $F_t$. For example consider a target block $b_1'$ in the target frame $F_{t+1}$. To this end the motion prediction module 44 determines a motion vector defining an offset between the target block in the target frame $F_{t+1}$ and a reference block (shown by the dotted line) in the reference frame $F_t$, such that when the reference block is translated from the offset position in the reference frame $F_t$ into the position of the target block $b_1'$ in the target frame $F_{t+1}$ it provides a best estimate of the target block $b_1'$. Note therefore that the dotted reference block is not necessarily an indexable block in the reference frame $F_t$, i.e. is not necessarily a predetermined subdivision of the reference frame, and may be offset by any arbitrary amount (and in fact may even be offset by a fractional number of pixels). Hence the reference block is made up of a contribution from four actual indexable blocks b1, b2, b3 and b4.

Accordingly, the calculation performed by the mode selection module 49 to determine $D_{ep\text{-}ref}$ for use in the update of the error propagation map $D_{ep}(n+1)$ comprises calculating a weighted sum of the distortions recorded for blocks b1 to b4 in the existing map $D_{ep}(n)$:

$$D_{ep\text{-}ref} = \sum_{i=1}^{4} w_i D_{ep}(i) \qquad (17)$$

where $w_i$ is the weight representing the contribution from block $b_i$ and $D_{ep}(i)$ is the error propagation map entry for block $b_i$.

The above describes a process of determining an initial error propagation map $D_{ep}$, using the error propagation map to select an optimal coding mode decision $o_{opt}$ for a subsequent coding, using the coding decision to update the map $D_{ep}$, then using the updated map in the next coding decision, and so forth, wherein the error propagation map represents an end-to-end distortion including an estimated effect of loss over the channel. E.g. reference is made again to Zhang. This may be referred to herein as loss-adaptive rate-distortion optimization (LARDO).

However, there is a problem with existing LARDO techniques in that they do not take into account the impact of past distortion due to loss propagating into the future, particularly in circumstances where there is little or no motion such as a static background or approximately static background. In such circumstances the inventors have noted that:

$$D_{ec\text{-}rec} \approx 0 \qquad (18)$$

In a basic concealment algorithm this is because the concealed block is copied from a preceding co-located block, and in the case of a static background the preceding co-located block will be the same as the current concealed block. That is, the error concealed and reconstructed samples in the encoder will be the same; or put another way, the concealment algorithm itself does not intrinsically introduce any distortion. A similar effect will also occur in a more sophisticated concealment algorithm.

Furthermore:

$$D_{ec\text{-}ep} \approx D_{ep} \qquad (19)$$

This is because, in absence of any intrinsic distortion from the concealment, the difference between the error concealed samples at the encoder and those as estimated to be seen at the decoder will only be copied from the existing error propagation map.

Substituting (18) and (19) into equation (3), it can be seen that this means:

$$D_{ep}(n+1) \approx (1-p)D_{ep}(n) + pD_{ep}(n) \approx D_{ep}(n) \qquad (20)$$

That is, in circumstances where the contribution from new loss is zero or negligible, the updated propagation map reduces to a contribution only from past loss (loss in the history used for prediction and/or concealment). Looked at another way, in the case of little or no motion, e.g. a substantially static background, the effect of any further loss over a channel and the associated concealment at the decoder will in itself have no intrinsic effect on the distortion, because a block copied or extrapolated from one frame to the next should in principle be identical (or in the case of a spatial concealment algorithm, a block which is copied, extrapolated or interpolated from one or more nearby blocks of a large, static region of uniform background will be very similar). The result is that $D_{ep}$ will remain the same indefinitely and not grow over time.

However, in reality the distortion will become increasingly relevant from a perceptual point of view, because the duration of an error is important in the perception of the error. That is to say, it is not just the magnitude of distortion that is relevant from a perceptual point of view, but also its duration.

A problem therefore exist in that, using existing techniques such Zhang [2], the distortion map which forms a basis for the making coding mode decisions will not always trigger intra coding early enough to prevent perceptually relevant artefacts.

In Zhang the error propagation map may increase over time, but only due to a contribution to the distortion that arises from continued ongoing loss over the channel, i.e. only due to new loss and associated concealment.

To address this problem, the present invention proscribes the use of an error propagation map which, in circumstances such as a static background where the contribution from new loss is zero or negligible, reduces to an expression which accumulates the contribution from past loss into the future:

$$D_{ep}(n+1) = \alpha D_{ep}(n) \qquad (21)$$

Where $\alpha > 1$. This may be considered as a temporal integration of the contribution from past loss over time.

For example, modifying Zhang the formula for the distortion map would become:

$$D_{ep}(m(k),n+1) = \alpha(1-p)D_{ep\text{-}ref}(m(k),n,o_{opt}) + p(D_{ec\text{-}rec}(m(k),n,o_{opt}) + D_{ec\text{-}ep}(m(k),n)), \qquad (22)$$

where $\alpha > 1$. As mentioned, a sufficiently large factor a and a nonzero $D_{ep\text{-}ref}$ will result in $D_{ep}$ growing even in conditions where the error concealment reconstruction distortion $D_{ec\text{-}rec}$ is zero, and thus, eventually triggering an intra coding.

That is, the effect of historical loss is amplified increasingly as more time passes, giving this distortion a greater weight in the optimization problem. Even if the actual distortion estimated in terms of difference between samples is not necessarily growing, the perception of the distortion becomes more significant with time and so older distortion should be given a greater weight when choosing whether to use inter or intra coding to encode the next frame or region.

The parameters $\lambda$ and $\alpha$ above may be tuned by the system designer. There is no right or wrong value for these parameters—the preferred values will depend on the particular quality the system designer decides to tolerate and the bitrate that can be supported by the channel By way of example, in one embodiment $\alpha$ may be in the range 1.003 to 1.005. A particular value of $\lambda$ is suggested by H.264 though this may also be tuned according to system design.

In a particularly beneficial embodiment, the mode selection module 49 may be configured to use different values of $\alpha$ may be used for different bitrates and/or channel conditions. In this case $\alpha$ may be adapted dynamically based on the currently detected channel condition(s), e.g. as reported in feedback from the decoder; and/or based on a dynamic setting or change of bitrate, e.g. based on a requested bitrate from the decoder or based on a user setting.

Note again that where a contribution due loss is mentioned in this application, or anything stating what happens "if" data lost over the channel or such like, this only relates to a probabilistic assumption (e.g. p) made by the encoder about what might be experienced by the decoder—the encoder of course does not know what will happen. The probabilistic assumption may be predetermined at the design stage based on statistical network modelling, and/or could even be determined dynamically based on feedback from the decoder.

It will be appreciated that the above embodiments have been described only by way of example.

While the above has been described in terms of slices, macroblocks and blocks, these terms are not intended to be limiting and the ideas described herein are not limited to any particular way of dividing or subdividing a claim. Further, the distortion map may cover a whole frame or a region within a frame, and coding decision process may be applied over the whole frame or only for a region within a frame.

Further, whilst the lower-complexity process has been exemplified as that of equations (2) and (3), and whilst the higher-complexity process has been exemplified as that of equation (1), or optionally or equation (22), it is possible to use other processes that use other combinations of the simplifying approximations discussed above. For example, it is possible for the lower-complexity process to exclude only transform but not quantization (i.e. to perform quantization in the spatial domain); or to include all of prediction, transform and quantization but still use a sum of absolute differences (SAD) as the distortion measure instead of sum of squared differences (SSD), or indeed other measure of difference between samples as a basis for quantifying distortion. In other examples, the higher-complexity process could take into account the effect of loss over a channel or error propagation, but still exclude transform and/or quantization, and/or still be based on an SAD or other distortion measure. All combinations are possible. Generally it is possible to choose any lower-complexity process and higher-complexity process where the lower-complexity process incurs fewer processing cycles (at the expense of performance) relative to the higher-complexity process. Note again also that in the first embodiment it is not necessary that different complexity RDO processes are applied to the two different groups of blocks or macroblocks—a processing saving is still achieved due to the limiting of the set of encoding modes that need to be considered for the first group of blocks or macroblocks based on those already chosen for the second group.

Further, where the present invention is described in terms of two frames n and n+1, according to certain embodiments of the invention it is not necessary for these to refer to two adjacent frames (though that may be the case in existing codecs). In some embodiments it is possible that inter prediction could be performed relative to an even earlier frame, and as such n and n+1 may be used in relation to the present invention to refer respectively to any previously encoded frame or image portion and a subsequent frame or portion to be predicted from it.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Other variants may become apparent to a person skilled in the art given the disclosure herein. The scope of the invention is not limited by the described embodiments but only by the appendant claims.

What is claimed is:

1. A method of encoding a video stream comprising a plurality of frames, each frame comprising a plurality of image portions, the method comprising:
for each of a plurality of first image portions to be encoded in an outgoing video stream, selecting a preferred one of a set of potential encoding modes using a first process comprising an estimation of distortion of the first image portion and a measure of bit rate required to encode the first image portion for each of the first image portion's potential encoding modes;
encoding each of the first image portions of the outgoing stream using the respective selected encoding mode;
for each of a plurality of second image portions of a video stream, applying a second process comprising at least an estimation of distortion of the second image portion, wherein the second image portions are image portions of a training video stream, and the second process is applied in a training phase prior to encoding the outgoing video stream; and
using an output of the second process resulting from the second image portions to bias the first process in said selection of the encoding modes for the first portions, the biasing the first process comprising:
applying both the second process and the first process to the second image portions in the training phase;
based on the training phase, determining a bias term representing a difference in one or both of the distortion estimation and the rate measure of the first and second processes; and
introducing the bias term into the first process when used to select the encoding modes of the first image portions.

2. The method of claim 1, wherein the first process is a lower-complexity process and the second process is a higher-complexity process.

3. The method of claim 2, wherein the lower-complexity process takes into account an effect of prediction coding in its estimation of distortion but not an effect of quantization; whereas the higher-complexity process takes into account the effect of prediction coding and quantization in its estimation of distortion.

4. The method of claim 3, wherein the lower-complexity process takes into account an effect of prediction coding in its estimation of distortion but not an effect of transformation from a spatial domain representation to a transform domain representation prior to quantization, whereas the higher-complexity process takes into account the effect of prediction coding, transformation and quantization in its estimation of distortion.

5. The method of claim 2, wherein the lower-complexity process does not take into account a cost of encoding a residual signal in its measure of bit rate, whereas the higher-complexity process does comprise a measure of bit rate taking into account the cost of encoding a residual signal.

6. The method of claim 2, wherein the lower-complexity process does not take into account an effect of entropy encoding in its measure of bit rate, whereas the higher-complexity process does comprise a measure of bit rate taking into account the effect of entropy encoding.

7. The method claim 2, wherein the higher-complexity process takes into account a probable effect of loss over a channel, whereas the lower-complexity process does not.

8. The method of claim 7, wherein the higher-complexity process integrates the effect of past loss forward over time.

9. The method of claim 1, wherein the set of encoding modes comprises at least an intra frame mode and an inter frame.

10. The method of claim 1, wherein the set of encoding modes comprises a plurality of intra frame modes.

11. The method of claim 1, wherein the set of encoding modes comprises a skip mode.

12. The method of claim 1, wherein the estimation of distortion of the second image portion is based, at least in part, on a frame loss rate at an associated decoder.

13. The method of claim 1, wherein the estimation of distortion of the first image portion is based, at least in part, on a sum of absolute differences (SAD) between original and predicted samples associated with the first image portion.

14. The method of claim 1 further comprising:
determining a number of the plurality of second image portions to apply the second process to based, at least in part, on available resources.

15. The method of claim 14, wherein the encoding each of the first image portions of the outgoing stream further comprises:
determining a number of the plurality of first image portions to encode based, at least in part, on available resources.

16. The method of claim 1, wherein the selecting a preferred one of a set of potential encoding modes is based, at least in part, on utilizing an error propagation distortion map associated with the video stream.

17. A terminal configured to operate in a communication system, the terminal comprising:
a CPU;
a storage medium
a video encoder stored on the storage medium and executable on the CPU and when executed, performs operations comprising:
for each of a plurality of first image portions to be encoded in an outgoing video stream, selecting a preferred one of a set of potential encoding modes using a first process comprising an estimation of distortion of the first image portion and a measure of bit rate required to encode the first image portion for each of the first image portion's potential encoding modes;
encoding each of the first image portions of the outgoing stream using the respective selected encoding mode;
for each of a plurality of second image portions of a video stream, applying a second process comprising at least an estimation of distortion of the second image portion, wherein the second image portions are image portions of a training video stream, and the second process is applied in a training phase prior to encoding the outgoing video stream; and
using an output of the second process resulting from the second image portions to bias the first process in said selection of the encoding modes for the first portions, the biasing the first process comprising:
applying both the second process and the first process to the second image portions in the training phase;
based on the training phase, determining a bias term representing a difference in one or both of the distortion estimation and the rate measure of the first and second processes; and
introducing the bias term into the first process when used to select the encoding modes of the first image portions.

18. The terminal of claim 17, wherein the first process is a lower-complexity process and the second process is a higher-complexity process.

19. The terminal of claim 18, wherein the lower-complexity process does not take into account a cost of encoding a residual signal in its measure of bit rate, whereas the higher-complexity process does comprise a measure of bit rate taking into account the cost of encoding a residual signal.

20. The terminal of claim 18, wherein the higher-complexity process takes into account a probable effect of loss over a channel, whereas the lower-complexity process does not.

21. The computer program product terminal of claim 18, wherein the lower-complexity process takes into account an effect of prediction coding in its estimation of distortion but not an effect of quantization;
whereas the higher-complexity process takes into account the effect of prediction coding and quantization in its estimation of distortion.

22. The terminal of claim 21, wherein the lower-complexity process takes into account an effect of prediction coding in its estimation of distortion but not an effect of transformation from a spatial domain representation to a transform domain representation prior to quantization, whereas the higher-complexity process takes into account the effect of prediction coding, transformation and quantization in its estimation of distortion.

23. The terminal of claim 17 embodied as a mobile phone.

24. The terminal of claim 17 embodied as a tablet computing device.

25. The terminal of claim 17 embodied as a laptop computer.

26. The terminal of claim 17 embodied as a desktop computer.

27. The terminal of claim 17 embodied as a television set.

28. The terminal of claim 17 embodied as a set-top box.

29. The terminal of claim 17, wherein the communication system comprises a packet-based network.

30. The terminal of claim 17 further comprising a video camera configured to capture images processed by the video encoder.

31. The terminal of claim 17, wherein the video encoder is further configured to perform operations comprising:
determining a number of the plurality of second image portions to apply the second process to based, at least in part, on available resources.

32. The terminal of claim 17, wherein the selecting a preferred one of a set of potential encoding modes is based, at least in part, on utilizing an error propagation distortion map associated with the video stream.

33. The terminal of claim 17, wherein the encoding each of the first image portions of the outgoing stream further comprises:
determining a number of the plurality of first image portions to encode based, at least in part, on available resources.

34. An apparatus comprising an encoder for encoding a video stream comprising a plurality of frames, each frame comprising a plurality of image portions, the encoder being configured to:
for each of a plurality of first image portions to be encoded in an outgoing video stream, select a preferred one of a set of potential encoding modes using a first process comprising an estimation of distortion of the first image portion and a measure of bit rate required to encode the first image portion for each of the first image portion's potential encoding modes;

encode each of the first image portions of the outgoing stream using the respective selected encoding mode;

for each of a plurality of second image portions of a video stream, apply a second process comprising at least an estimation of distortion of the second image portion, wherein the second image portions are image portions of a training video stream, and the encoder is configured such that the second process is applied in a training phase prior to encoding the outgoing video stream; and use an output of the second process resulting from the second image portions to bias the first process in said selection of the encoding modes for the first portions, the biasing the first process comprising:

applying both the second process and the first process to the second image portions in the training phase;

based on the training phase, determining a bias term representing a difference in one or both of the distortion estimation and the rate measure of the first and second processes; and introducing the bias term into the first process when used to select the encoding modes of the first image portions.

35. The apparatus of claim 34, wherein the first process is a lower-complexity process and the second process is a higher-complexity process.

36. The apparatus of claim 35, wherein the lower-complexity process takes into account an effect of prediction coding in its estimation of distortion but not an effect of quantization; whereas the higher-complexity process takes into account the effect of prediction coding and quantization in its estimation of distortion.

37. The apparatus of claim 36, wherein the lower-complexity process takes into account an effect of prediction coding in its estimation of distortion but not an effect of transformation from a spatial domain representation to a transform domain representation prior to quantization, whereas the higher-complexity process takes into account the effect of prediction coding, transformation and quantization in its estimation of distortion.

38. The apparatus of claim 35, wherein the lower-complexity process does not take into account a cost of encoding a residual signal in its measure of bit rate, whereas the higher-complexity process does comprise a measure of bit rate taking into account the cost of encoding a residual signal.

39. The apparatus of claim 35, wherein the higher-complexity process takes into account a probable effect of loss over a channel, whereas the lower-complexity process does not.

40. The apparatus of claim 35, wherein the encoder is further configured to determine a number of the plurality of second image portions to apply the second process to based, at least in part, on available resources.

41. The apparatus of claim 35, wherein the apparatus is further configured to select a preferred one of a set of potential encoding modes based, at least in part, on utilizing an error propagation distortion map associated with the video stream.

42. The apparatus of claim 35, wherein the apparatus is further configured to the encode each of the first image portions of the outgoing stream at least by determining a number of the plurality of first image portions to encode based, at least in part, on available resources.

* * * * *